May 8, 1951 W. C. BUTTNER ET AL 2,551,823
HEATING SYSTEM
Filed Feb. 10, 1945 2 Sheets-Sheet 1
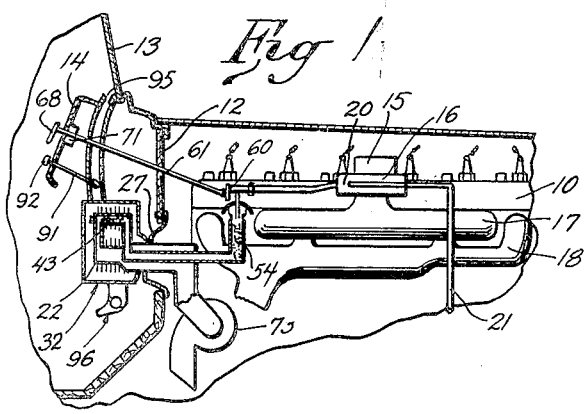
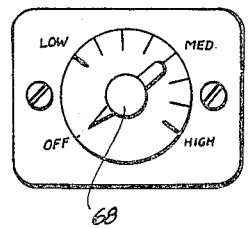
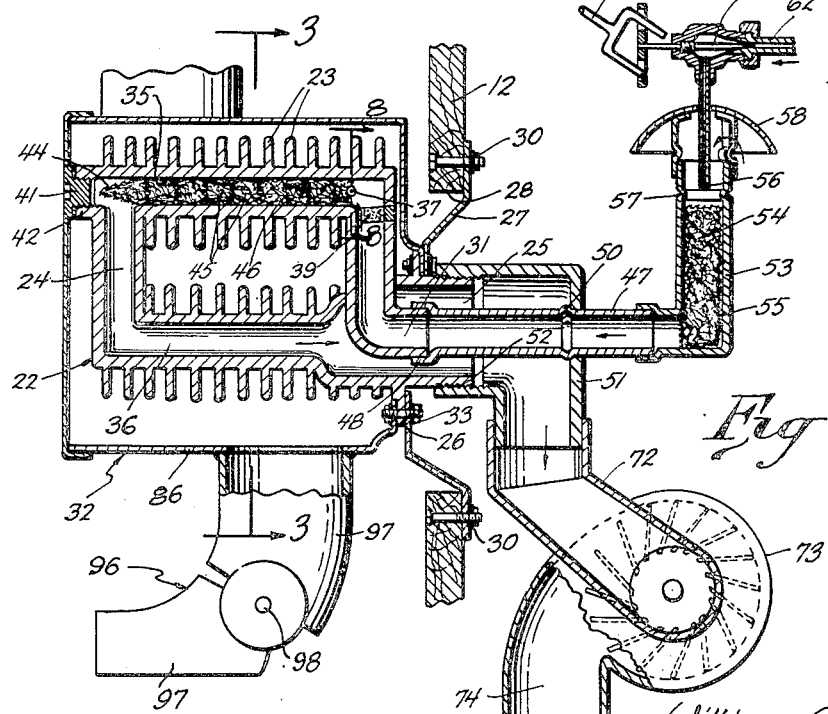
William C. Buttner
Jerome R. Bunce
INVENTORS.

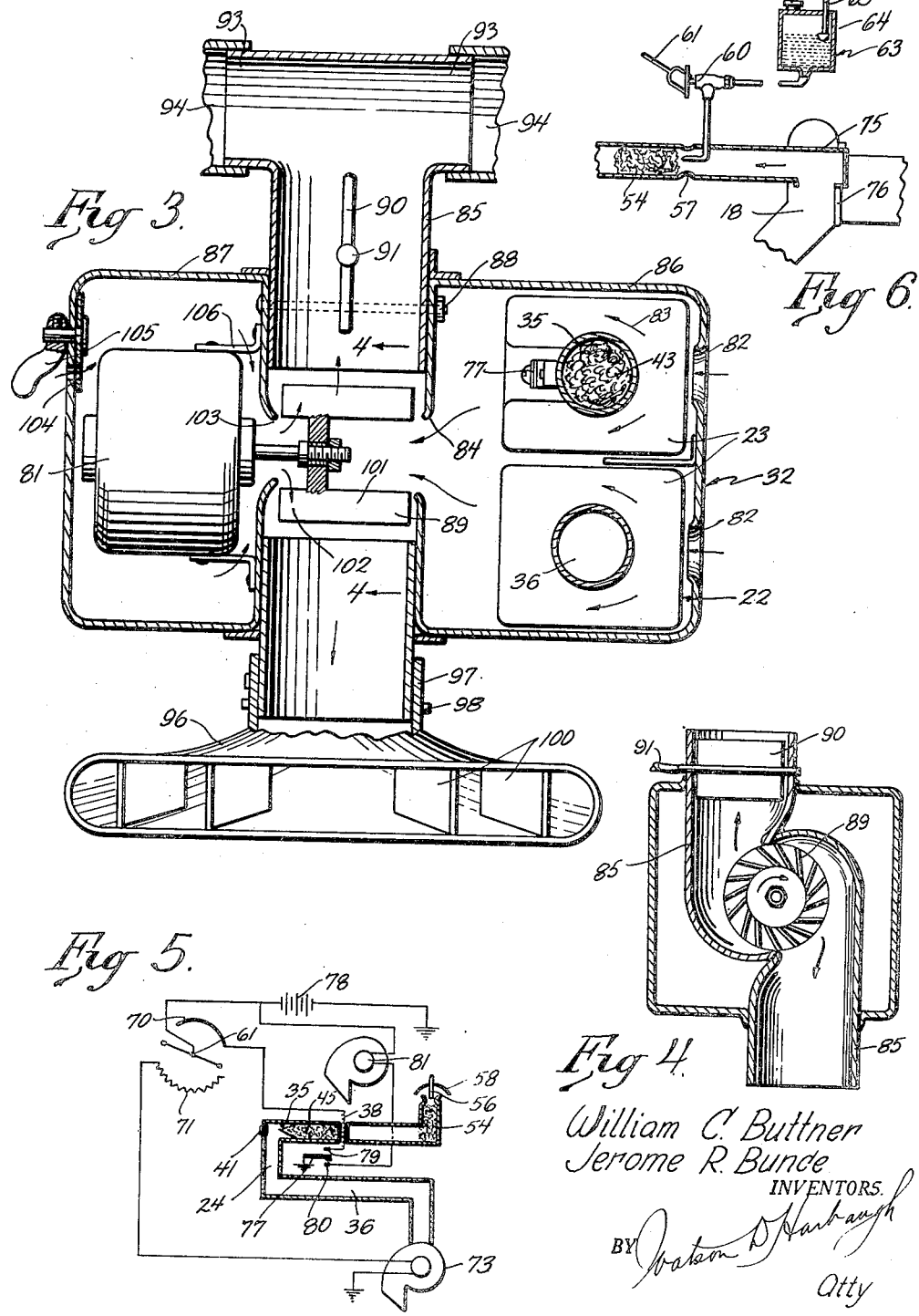

Patented May 8, 1951

2,551,823

UNITED STATES PATENT OFFICE 2,551,823

HEATING SYSTEM

William C. Buttner, Winnetka, and
Jerome R. Bunce, Chicago, Ill.

Application February 10, 1945, Serial No. 577,256

17 Claims. (Cl. 237—28)

The present invention relates generally to heating systems and more particularly to a space heating arrangement for motor vehicles, trailers and compartments.

There are two general types of heaters for motor vehicles. One utilizes the heat developed in the engine as a source of heat, such as water radiators in circuit with the cooling system of the engine or hot air or steam radiators in heat exchange relationship with the exhaust gases from the engine. The other type converts fuel into heat independently of, or in conjunction with the operation of the engine depending upon whether the intake manifold of the engine is used for creating the necessary draft or a separate blower operating either as a compressor or suction device.

The present invention relates to the second or heat generating type of heater but differs materially from conventional heaters of this type heretofore used in that it does not require a flame or an element producing a kindling temperature for the fuel to establish and maintain thermal conversion.

Furthermore, the invention is characterized by its ability to utilize, without change either a gasoline, such as used for the engine, or, any one of a number of other fluid fuels available, such as alcohols, butane, propane, municipal gas, etc.

An object of the invention is to provide a heat generating heater for compartments in which the heat output can be varied infinitely over a wide range without danger of the heater going out or generating an explosive condition.

A further object of the invention resides in the relationship that air can be drawn through the heating coils of the heater to moderate the temperature generated therein and in surplus quantities to assure complete utilization of the thermal value of the fuel.

Although it is possible to utilize the partial vacuum developed in the intake manifold to induce a draft when the engine is running, it is a further object of the invention to provide a rapidly starting heater which is self-sufficiently operative independently of engine operation.

A further object of the invention is the provision of a heat generating heater which generates heat and starts itself at temperatures without the use of flame or an incandescent element located in the path of the fuel which has caused explosion in conventional heaters.

A further object of the invention is to provide a heater which operates to generate heat from mixtures of fuel and air where the proportion of air is greater than that present with a mixture within the range of flame combustion for reasons of safety and greater efficiency in consumption of fuel.

Another object of the invention is to provide an improved heat radiator for motor vehicles, which is easily controlled, inexpensive to operate, efficient in its conversion of thermal properties of the fuel, and easily installed and maintained.

These being among the objects of the invention, other and further objects will appear from the drawings, the description relating thereto and the appended claims.

Referring to the drawings:

Fig. 1 is a fragmentary sectional view taken from the side of an automobile showing a preferred embodiment of the invention.

Fig. 2 is an enlarged vertical section through the heating system illustrated in Fig. 1.

Fig. 3 is a section taken upon line 3—3 in Fig. 2.

Fig. 4 is a vertical section taken upon the line 4—4 in Fig. 3.

Fig. 5 is a schematic view of the preferred electrical circuit employed for operating the invention.

Fig. 6 is a fragmentary view illustrating a modified form of carburetion and carburetion control for the invention.

Fig. 7 is a plan view of the control panel for the invention as it appears upon the instrument panel of a motor vehicle, Fig. 8 is a section taken upon the line 8—8 in Fig. 2, and Fig. 9 is a view similar to Fig. 6 showing a further modification in which the fuel mixture can be changed by varying both the fuel and air.

In the present invention a catalyzer bed composed of catalytic agents such as compositions or elements of palladiumized or platinized material such as asbestos or a porous ceramic, platinum or palladium black, spongy platinum, nickel elements, or combination of any of these, is located in a flowing stream of air having a variable amount of vaporizable fuel or vapor fuel in it such as gasoline, butane, propane, alcohol, municipal gas, etc. Such catalytic agents are frequently described as primary adsorption catalysts for they operate to increase the reaction rate by adsorbing one or more of the reactant gases on their surface by primary valence forces which effect an activation or deforming of the molecules which makes them more susceptible to combine with the other reactants. The terms "catalyst" and "catalytic agent" as used herein are meant to include only such primary adsorption catalysts. A heater means is preferably located ahead of the bed to take the chill off of the flowing stream which has been cooled by vaporization of the fuel and to dry it, and this heater means may be a portion of the exhaust manifold of an internal combustion engine, a resistance wire located inside a copper tube where it is sealed from direct contact with the stream, or a tube conducting hot exhaust gases from the engine in heat exchange relationship with the mixture. With the exhaust manifold connection the entire stream of fuel-air mixture is brought to a temperature high enough to complete vaporization without being appreciably chilled below 100° F., the latent heat of vaporization for a particular fuel being known. However, this arrangement has the object that the engine must be started or running at the time. With the copper tube or other devices at least a portion of the stream is warmed enough to dry the mixture so that the generation of heat or thermal reaction may take place in the catalyzer bed. With some fuels thermal reaction will take place without need for the vaporizing action of the heater means. Such fuels are generally those normally vapor at operating pressures if they are not chilled.

Draft is induced preferably by suction rather than pressure because with suction the fuel is induced to flow into the air stream, whereas, if pressure is used the pressure opposes the introduction of the fuel unless the fuel is introduced ahead of the compressor, in which case certain dangers exist such as sparks being struck from moving parts which might ignite certain limited portions of the fuel-air mixture where the proportions might be within the explosive range.

A separate source of fuel may be provided which is less volatile than the fuel supplied to the engine where airplane installations are considered if the gasoline supply is to be conserved, or, in event the vehicle is powered with Diesel oil. For this purpose any fuel whose lighter components vaporize at room temperatures will suffice although natural gas, propane, butane, alcohol and gasoline are preferred in that order if available.

Referring now to the drawings in further detail, a portion of an internal combustion engine 10 is shown located under the hood 11 in front of the dashboard 12 of a conventional automobile having a windshield 13 and an instrument panel 14. The automobile is representative also of motor boats and airplanes. The engine 10 is provided with the usual air intake 15, carburetor 16, and intake and exhaust manifolds 17 and 18. The carburetor 16 is provided with a fuel well such as that indicated at 20 which is supplied with gasoline from a suitable source as from a storage tank (not shown) through a pipe 21 leading either from a vacuum tank or fuel pump (not shown).

By way of illustrating the preferred form of the invention, a radiator 22 made preferably of an aluminum casting is mounted upon the dash 12 beneath and forward of the instrument panel 14. As more particularly shown in Fig. 2, the radiator is provided with fins 23 disposed around a generally loop shaped passage 24 having an outlet portion 25 flanged as at 26 to be bolted to a mounting plate 27 which is secured in an opening 28 upon the dash 12 by bolts 30. The inlet portion 31 of the passage 24 extends into and is disposed coaxial with the outlet 25. Both inlet and outlet openings open forwardly into the engine compartment through the mounting plate 27 and are preferably the lowest point in the radiator so that water condensation during idle periods will run out of the radiator and not dampen the bed.

The housing 32 may be mounted directly upon the radiator 22 although in its preferred form the same is mounted upon the flange 26 to be held in place by mounting bolts 33 threaded into the flange 26 and tightened into place against lock washers 34.

Although the radiator passage 24 may be located in a horizontal plane it is preferred to dispose it in a vertical plane with any one of a number of parallel passages (not shown) interconnecting the upper horizontal compartment 35 and the lower horizontal compartment 36.

The inlet 31 is in communication with the upper compartment 35 past a transverse tubular portion 37 cast integrally with the radiator in which a heating or resistance wire 38 is mounted upon insulating plugs 40 (Fig. 8).

Access is had to the upper compartment which will hereinafter be referred to as the reaction chamber, through a removable plug 41 threaded into a boss 42, the opening closed by the plug 41 being of substantially the same diameter as the reaction chamber 35.

Within the reaction chamber is disposed a catalyst bed 43 made of a metal screen envelope 44 filled with alternate layers of palladiumized asbestos 45 and screen separators 46 made of nickel or Nichrome wire of fine mesh. An asbestos bed impregnated with platinum or palladium black and wrapped in a fine mesh nickel screen has proven to be particularly successful and of long life.

Whenever the plug 41 is removed, the catalyzer bed 43 as a unit can be removed and serviced or replaced if it becomes desirable to service the heater in event the catalyzer bed becomes poisoned or requires rejuvenation. A groove in the end of the bed locates the bed with respect to the tube 37.

A mixture of fuel and air is supplied to the inlet 31 by means of a tube 47 flared as at 48 to telescope over the mouth of the inlet 31 and flanged as at 50 to receive an elbow 51 threaded as at 52 upon the outlet 25 to hold the tube 47 in place.

At the outer end of the tube 47 a suitable carburetor may be provided which preferably is set or controlled to supply a fuel-air mixture having a ratio that is outside of the limits of combustion. In the particular application the amount of air is greater than that required to support flame combustion. Such a carburetor is indicated at 53 which has a vaporizing bed 54 therein of copper wool held in place by a copper screening 55 below a nozzle 56 located at the critical point of a venturi throat 57 provided in the tube by inwardly upsetting the wall thereof.

Because of possible Underwriter Laboratory requirements, a flash arresting means such as a porous metal insert 58 known as Porex or screen may be located any place between the bed and the carburetor as near to the catalyzer bed as possible.

An air shield 59 guards against foreign matter falling into the carburetor and a needle valve 60, controlled through an angular yoke member 61, is employed to meter the amount of fuel permitted to be drawn into the carburetor 53. The fuel supply line 62 leading to the valve 60 may be connected to the float bowl 20 of the carburetor 16 on the engine as shown in Fig. 1 or, to a separate source 63 of fuel supply as shown in Fig. 6 wherein a tank 64 having a float gauge 65 thereon and a filler cap 66 is mounted in any suitable place to supply fuel 67 to the carburetor 53. If butane is supplied to the engine, connection can be made ahead of the demand regulator and the vaporizer bed dispensed with.

If gasoline is used in the engine, it is preferred to connect the fuel conduit 52 to the bowl of the engine carburetor unless as mentioned in airplanes it is desirable to conserve the gasoline for use in the engines. If not connected to the same source as the engine, the fuel supplied may be any one of a number of fuels enumerated, the bed mentioned working particularly well with gasoline, butane and alcohol.

The yoke control 61 leads to a handle 68 (Fig. 7) which also controls an "on" and "off" switch 70 (Fig. 5) and a rheostat 71.

To the outlet of the elbow 51 is connected the inlet passage 72 of a blower 73 which exhausts downwardly through an opening 74 to the atmosphere well below the engine compartment. The blower 73 is employed to induce a draft through the radiator and carburetor 53 by which air is drawn past the venturi 57 to pick up fuel admitted through the valve 60 and carry it through the bed 54 where evaporation and thorough homogenization is accomplished. From the evaporator 54 the fuel and air are advanced past the tube 37 which when heated by the resistance wire 38 will take the chill off of the fuel-air mixture incurred in vaporization and preferably warm the mixture to a temperature within the range of 150° to 200° F. to assure complete vaporization of the fuel. After the mixture has parted contact with the tube 37 it will pass into the catalyzer where the autogenous reaction takes place with an accompanying release of heat and hot gases to warm the radiator. What heat is not absorbed by the radiator in the upper passage way will be carried by the hot gases through the lower passageway 36. From the lower passage the gases are drawn over the inlet to assist in warming the fuel-air mixture and then scavenged by the blower 73.

The blower 73 is preferably located at the outlet of the radiator 22 so that subatmospheric pressures created will, among other things mentioned, further assist in vaporizing the fuel in the air at the carburetor 53.

Referring to Fig. 6 an embodiment is shown for pre-warming the air against the chill of vaporization by means of the incoming air being drawn along the exhaust manifold 18 of the engine through a sleeve 75 held in place by a band 76. With this arrangement the tube 37 and heater wire 38 may be eliminated or used as desired, it being appreciated that the heater wire 38 is protected against direct contact with the incoming fuel-air mixture to avoid any danger of the wire igniting the mixture if by accident or unskilled adjustment of the device a fuel-air mixture is supplied to the radiator in a ratio within the limits of combustion. A bare wire can be employed if it is so safeguarded by resistances and other controls that its temperature does not reach the kindling point of the fuel. Such a wire would be satisfactory from a safety viewpoint if it were not permitted to become any hotter than it would with a dull red glow.

Referring to Fig. 9 another form of carburetor is illustrated in which a container 63a is provided with a gauze or blanket 69 soaked with the fuel. A part of the air is drawn through the blanket for saturation with the fuel and the other part of air is drawn through a by-pass with a valve 59 regulating the proportions in a way comparable to the valve 60.

A thermo-sensitive bimetal strip 77 is mounted outside and upon the wall of the upper chamber 35 where it is subjected to the heat developed in the reaction chamber 43. The bimetal strip serves as the moving pole between two electrical contacts 79 and 80, the one 79 of which is engaged when the bimetal is cold and controlling the electrical current to the resistance wire 38 in series with the switch 70. With this arrangement electricity is supplied by the battery 78 to energize the resistance coil 38 whenever the switch 70 is closed and the bimetal strip 77 is cold. The other contact 80 is engaged by the bimetal strip 77 when it is warm. Engagement with the contact 80 places a blower 81 in operation which, as shown in Fig. 3, draws in air over the radiator and drives it out into the occupant compartment. This air is drawn in through elongated openings 82 stamped in the housing 32 which openings extend parallel with the upper and lower passages 35 and 36 of the radiator. The blower 81 can be started at the same time as the heater if desired because the cooling effect thereof is negligible as far as the reaction is concerned.

Beyond the openings 82, as shown by arrows 83, the air passes between and in heat exchange relationship with the fins 23 to the inlet opening 84 of the blower. The cage of the blower is made up of two substantially identical elements 85 as shown in Fig. 4 having openings which make up with close clearance with the circumference of blades 89 of the blower, the elements 85 being arranged to be held in place between the radiator portion 86 of the housing 32 and the motor compartment portion 87 of the housing 32. Bolts 88 are employed to hold these elements in assembled relationship and the housing walls of the two portions 86 and 87 are stamped to provide suitable grooves for holding these elements in correct position where they will cooperate with the blower blades 89 properly without danger of the blades striking them.

The upper end of the upper one of the elements 85 is provided with a butterfly valve 90 controlled from the instrument panel by a flexible cable 91 operated by a handle 92 (Fig. 1) and the outlet thereof is bifurcated as at 93 for connection with suitable conduits 94 leading to the defroster slots 95 opening upwardly behind the windshield 13. Movement of the butterfly valve 90 controls the amount of air driven by the vanes 89 into the upper element for defrosting purposes. If completely closed, the vanes 89 merely cavitate with respect to the upper element and deliver the air to the lower one of the two elements 85. A nozzle 96 is swiveled to the lower end of the lower element as at 97 and pivoted for movement up and down as at 98. The mouth of the nozzle as viewed in Fig. 3 is flared and provided with deflectors 100 to fan out the air stream and direct it either downwardly against the floor of the vehicle or horizontally towards the seats of the automobile depending upon its elevation, and, to one side of the car or the other depending upon its swiveled position.

Vanes 89 of the blower are divided into two effective blower portions, the one 101 drawing the air over the radiator and the other, 102, moving air from the motor compartment 87 of the housing 32 into the members 85 through an opening 103. Air can enter the motor compartment either from the engine compartment of the automobile if outside air is desired, or through a vent 104 controlled by a handle 105 if air already in the compartment is to be recirculated without contact with the radiator 22. This air serves to keep the motor 81 and compartment 87 quite cool. The motor 81 is mounted within the housing portion 87 upon brackets 106 in a suitable manner as by bolts.

In operation the handle 68 is located in an "off" position which is the position of the contacts as illustrated in Fig. 5. As the handle 68 is moved to "low" position, engagement is had with the contact 70 to close the battery circuit through the resistance wire 38 and bimetal strip 77 as already described. At the same time that this engagement is established the switch also engages the rheostat 71 to start the blower 73 and create a draft through the radiator as already described. Further movement of the handle to the right will operate to open the valve 60 which is provided with a left hand thread for this purpose and fuel will begin to flow to the nozzle of the carburetor 53 to be picked up by air moved by the blower 73. After the air and fuel mix in the evaporation bed 54, the tube 37 shielding the resistance wire 38 from direct contact with the fuel will become warm and the fuel-air mixture flowing across it will be dried and vaporization assured. From contact with the tube the mixture will flow into the catalyzer bed to start the reaction between the fuel and air in the presence of the catalyzer to liberate heat. This heat will be absorbed in the radiator walls until such time that the bimetal 77 is warmed. Thereupon the bimetal breaks engagement with the contact 70 and moves into engagement with the contact 80 to start the blower 81. Thereafter any setting of the handle 68 between the "low" and "high" position upon the dial will determine the heat output of the device, and such setting will be made according to the comfort of the occupants.

In certain installations it may be desirable to have a constant draft-volume of air induced by the blower 73 in which case the blower 73 is connected in series with the contact 80 and the air flow through the carburetor 53 is maintained constant by a restricting orifice of predetermined size. With this arrangement the only thing that requires adjustment to vary the heat output of the heater is the amount of fuel inducted into the stream of flowing air. In either event it is desirable for safety reasons to adjust the fuel and air ratio to exceed the limits of combustion so that there will be little, if any, danger of explosion in the radiator.

The catalyzer will convert fuel present in the air into heat regardless of the fuel-air ratio. This conversion takes place without the flame, generally referred to in conventional gasoline heaters as combustion, and in most instances the temperatures will be well below the kindling point of the fuel whereby the heat output of the device is not only mild and adequate but can be varied infinitely between warm and hot without "going out" merely by adjusting the amount of fuel that is supplied to the air considering also the moderating effect present with any excess amounts of air that might have been passing through the catalyzer bed.

For those installations where a high concentration of heat is desired at the start or constantly, the present invention can be adjusted to supply a fuel-air mixture within the limits of combustion in which case the heat generated in the catalyzer bed will approach or exceed the kindling temperature of the fuel. In such installations the embodiment can be provided with a flash arrester between the tube 37 and the catalyzer bed 43 to prevent possible flash backs. Under these circumstances with the incoming mixture warmed to complete vaporization and dry it, the mixture will react in the presence of the catalyzer without being cooled by extra air passing through the radiator. Thus the present invention can be adapted to provide high heat if desired although in its use for passenger vehicles its arrangement for moderate heat without danger of explosion is preferred.

Having thus described the invention, several modifications and possible constructions, it will be readily apparent to those skilled in the art that various and further changes can be made without departing from the spirit of the invention, the scope of which is commensurate with the appended claims.

What is claimed is:

1. A heater of the class described for motor vehicles including a radiator unit having the inlet and outlet thereof in heat exchange relationship through a common wall, means for generating heat in the radiator comprising a primary adsorption catalyst bed, means for supplying a fuel-air mixture to the bed through the inlet, said mixture being warmed and dried by warm gases leaving the outlet of the radiator.

2. A heater of the class described for motor vehicles having a compartment wall including a radiator unit having coaxial inlet and outlet conduits in heat exchange relationship through a common wall, means for mounting the radiator on the compartment wall including said conduits, a primary adsorption catalyst for generating heat in the radiator, means upon the compartment side of the compartment wall for circulating air over said radiator, and means upon the other side of the compartment wall for supplying a fuel-air mixture to the generating means through the inlet to be warmed by warm gases leaving the outlet of the radiator.

3. In a motor vehicle having a riding compartment and an engine compartment separated by a wall, the combination of a radiator disposed in heat exchange relationship with the air in the riding compartment, a reaction chamber in the radiator, a primary adsorption catalyst in the reaction chamber, means for supplying a fuel-air mixture, means for warming said mixture, and means in the engine compartment for drawing said warmed mixture into the reaction chamber.

4. In a motor vehicle having a riding compartment and an engine compartment separated by a wall, the combination of a radiator disposed in heat exchange relationship with the air in the riding compartment, means for circulating air in the riding compartment over the radiator, a reaction chamber in the radiator, a primary adsorption catalyst in the reaction chamber, means for supplying a fuel-air vapor mixture, means for warming said mixture, and means in the engine compartment for drawing said warmed mixture into the reaction chamber in contact with the catalyst to liberate heat to the radiator.

5. In a motor vehicle having a riding compartment, the combination of a reaction chamber, a primary adsorption catalyst in the reaction chamber, carburetor means for mixing fuel and air, means for moving the fuel-air mixture through said chamber over the catalyst to liberate heat, means for dissipating the liberated heat in the riding compartment, and means for varying the proportions of fuel and air beyond the limits of flame combustion.

6. In a motor vehicle having a riding compartment, the combination of a radiator having a reaction chamber, a primary adsorption catalyst in the reaction chamber, carburetor means for mixing a vaporizable fuel and air, means for moving the fuel-air mixture through said chamber over the catalyst to liberate heat to the radiator, means for dissipating in the riding compartment the heat received by the radiator, and means for varying the proportions of fuel and air beyond the limits of flame combustion.

7. A heater of the class described for motor vehicles comprising a radiator having a passage therethrough, a primary adsorption catalyst bed disposed in said passage means for mounting the radiator on one side of a substantially vertical wall of the vehicle body, means for generating hot gases for movement through said radiator passage, the outlet of said passage being the lowest point of the passage whereby condensation during resting periods of the heater will drain from the radiator.

8. The combination with a motor vehicle having a riding compartment and wall, a radiator having an inlet and outlet at the lowest point in the radiator and in heat exchange relationship with each other, means for mounting said radiator with said inlet and outlet through a single hole in the wall, means for supplying the inlet with a mixture of a vaporizable fuel and air, means including a primary adsorption catalyst bed for liberating heat in the radiator from the fuel-air mixture, means for establishing a draft for the fuel-air mixture to move it through the radiator and means for circulating the air in the riding compartment over the radiator.

9. A heater of the class described comprising a space heating radiator, means for forming a nonignitable mixture of air and a vaporizable fuel, a primary adsorption catalyzer bed, means of communication between the mixing means radiator and catalyzer bed, and means for propelling the mixture of air and fuel through the communication means and over the catalyzer bed, said fuel and air reacting upon the catalyzer bed to liberate heat to the radiator.

10. A heater of the class described comprising a space heating radiator, means for mixing air and a vaporizable fuel, a primary adsorption catalyzer bed, means of communication between the mixing means radiator and catalyzer bed, means for propelling a mixture of air and fuel through the communication means and over the catalyzer bed, said fuel and air reacting upon the catalyzer bed to liberate heat to the radiator, and means for varying the ratio of fuel and air present in the mixture from a lean nonignitable mixture to a relatively rich ignitable mixture during operation of the heater.

11. A heater of the class described comprising a space heating radiator mounted for communication with the riding compartment of a motor vehicle, means for mixing air and a vaporizable fuel, a primary adsorption catalyzer bed, means of communication between the mixing means radiator and catalyzer bed, means for propelling the mixture of air and fuel through the communication means and over the catalyzer bed, means for homogenizing and drying said fuel air mixture before contacting the catalyzer bed, said fuel and air reacting upon the catalyzer under conditions of flameless combustion to liberate heat to the radiator.

12. A heater of the class described comprising a space heating radiator, means for mixing air and a vaporizable fuel, an asbestos bed coated with platinum black in the radiator, means of communication between the mixing means and radiator, means for propelling a mixture of air and fuel through the communication means and over the asbestos bed, means for circulating air over the radiator, means for warming the fuel-air mixture entering the radiator to dry it, said fuel and air reacting upon the coated asbestos bed without ignition to liberate heat to the radiator.

13. A heater of the class described comprising a space heating radiator, means for mixing air and a vaporizable fuel in proportions beyond the limits of flame combustion, an asbestos bed coated with primary adsorption catalytic material, means of communication between the mixing means radiator and asbestos bed, and means for establishing a draft for the mixture of air and fuel through the communication means and over the catalyzer bed, said fuel and air reacting below the ignition temperature upon the asbestos bed to liberate heat to the radiator, and means for varying the proportions of fuel and air in said mixture.

14. The method of heating a metal radiator comprising mixing a volatile fuel and air in proportions beyond the range of flame combustion, reacting the fuel and air upon a primary adsorption catalyst bed under forced draft to liberate heat and heat said bed, conducting heat from said bed directly to said metal radiator to heat said radiator, and conducting the products of said reaction away from said bed to the atmosphere.

15. The method of heating a radiator comprising forming a stream of a vaporizable fuel and air in proportions beyond the range of flame combustion, conducting the stream over a primary adsorption catalyst bed in direct contact with said radiator to liberate heat and heat said bed, conducting the heat from said bed to said radiator, conducting the products of the reaction in close proximity to said stream prior to its entering said bed to preheat and dry said stream, and discharging the products to the atmosphere.

16. The method of heating a radiator comprising mixing a vaporizable fuel and warmed air in proportions wherein a mixture is supplied which is too lean to support flame combustion, reacting the fuel and air upon a primary adsorption catalyzer bed under forced draft and subatmospheric pressure to liberate heat, absorbing liberated heat by said radiator, and confining the flow of the by-products of the reaction for discharge to the atmosphere at a point remote from said radiator.

17. A heater of the class described comprising a space heating radiator, means for forming a nonignitable mixture of air and a vaporizable fuel, a catalyzer bed, said bed comprising a finely divided primary adsorption catalyst, means of communication between the mixing means radiator and catalyzer bed, and means for propelling the mixture of air and fuel through the communication means and over the catalyzer bed, said fuel and air reacting upon the catalyzer bed to liberate heat to the radiator.

WILLIAM C. BUTTNER.
JEROME R. BUNCE.

(References on following page)

REFERENCES CITED

The following references are of record in the file of this patent:

UNITED STATES PATENTS

| Number | Name | Date |
|---|---|---|
| 1,880,178 | Krause | Sept. 27, 1932 |
| 1,923,614 | Clarkson | Aug. 22, 1933 |
| 2,165,269 | Karsel | July 11, 1939 |
| 2,188,133 | Hepburn | Jan. 23, 1940 |
| 2,308,887 | McCollum | Jan. 19, 1943 |
| 2,321,940 | Robertson | June 15, 1943 |
| 2,332,094 | McCollum | Oct. 19, 1943 |
| 2,379,017 | McCollum | June 26, 1945 |
| 2,391,447 | Edge | Dec. 25, 1945 |

FOREIGN PATENTS

| Number | Country | Date |
|---|---|---|
| 469,515 | Great Britain | July 27, 1937 |

OTHER REFERENCES

"Surface Combustion and its Industrial Application," Journal of Gas Lighting, April 4, and April 11, 1911.

Handbook of Chemistry and Physics, 25th edition, p. 2164 (Chemical Rubber Publishing Company, Cleveland, Ohio).